United States Patent [19]
Nishii et al.

[11] Patent Number: 4,892,361
[45] Date of Patent: Jan. 9, 1990

[54] HYDRAULIC BRAKE BOOSTER

[75] Inventors: Michiharu Nishii, Toyota; Yoshihiko Tada, Hazu, both of Japan

[73] Assignee: Aisin Seiki Kabushiki Kaisha, Kariya, Japan

[21] Appl. No.: 231,439

[22] Filed: Aug. 12, 1988

[30] Foreign Application Priority Data

Aug. 13, 1987 [JP] Japan .................................. 62-202255

[51] Int. Cl.[4] ............................................. B60T 13/12
[52] U.S. Cl. ..................................... 303/114; 303/113
[58] Field of Search ....................... 303/113, 114, 117; 16/35 R

[56] References Cited

U.S. PATENT DOCUMENTS 2,905,275  9/1959  Kostolecki et al. ................. 16/35 R
4,555,144 11/1985  Belart et al. ...................... 303/114 X
4,702,530 10/1987  Belart et al. ...................... 303/114 X Primary Examiner—Andres Kashnikow
Assistant Examiner—Matthew C. Graham
Attorney, Agent, or Firm—Burns, Doane, Swecker & Mathis

[57] ABSTRACT

A hydraulic brake booster is provided which actuates a master cylinder by a hydraulic power pressure supplied from a power source in response to an input rod connected to a brake pedal. The arrangement includes a housing connected to the master cylinder, a power piston slidably disposed in a boost chamber which defined in the housing and transmitting a boost force which is generated in response to the input rod. A hydraulic pressure control valve is provided which has a valve body moved between a power position communicated with the power source and an initial position communicated with a reservoir in the boost chamber on an axis extending substantially in parallel with a sliding axis of the power piston. A control lever engages with the valve body of the hydraulic pressure control valve at its one end and engages with the power piston at its other end. A support lever is pivotally connected with the input rod at one end and a support member installed to the housing pivotally movable and regulating at least the initial position of the valve body of the hydraulic pressure control valve through the one end of the control lever.

3 Claims, 3 Drawing Sheets

HYDRAULIC BRAKE BOOSTER

BACKGROUND OF THE INVENTION

1. Field of the Invention

The present invention relates to a servo unit of a braking system for use in an automotive vehicle, and more particularly to a hydraulic brake booster which actuates a master cylinder by a hydraulic pressure supplied from a power source in response to actuation or depression of a brake pedal.

2. Description of the Prior Art

In a conventional service braking system for an automotive vehicle, a servo unit is provided which may be alternatively referred to as a booster. The unit permits a reduction in the force required to operate or actuate a brake pedal in a braking operation. The servo unit utilizes compressed air, intake manifold vacuum, or hydraulic pressure as a power source and are distinguished from an air brake booster, a vacuum brake booster, or a hydraulic brake booster operated in response to a power source. The hydraulic brake booster includes a hydraulic pressure control valve actuated in response to the actuation or depression of the brake pedal and which regulates the hydraulic pressure supplied from the power source to a boost pressure and actuates the master cylinder by the boost pressure. In a known hydraulic brake booster, a lever operated type controls the hydraulic pressure control valve by a pair of levers which consists of a support lever and a control lever actuated by the operation of the brake pedal and the operation of a power piston actuated in response to the boost pressure, respectively. A conventional hydraulic brake booster of this kind is disclosed, for example, in Japanese application Laid-open publication No. 50-74079 published on June 18, 1975. In this conventional hydraulic brake booster, the hydraulic pressure control valve is constituted by a spool valve. In operation of this conventional hydraulic brake booster, only a small shock is generated when the hydraulic control valve is opened and shut, thus permitting smooth operation.

In the above prior hydraulic brake booster, however, since the pair of levers which control the operation of the spool valve are supported or hung by a pin fixed to a housing, a positional relationship between the levers and the spool valve is rigidly defined. Accordingly, the accuracy of the dimensions of the spool, levers, housing and so on are very important when lap quantity of the spool valve is determined. Further, the limits of the dimensional accuracy requires a design which takes into consideration an error of measurement which exceeds the limits of accuracy and needed scattering. Particularly, the lap quantity is an important factor which is of concern in an idle stroke when the spool advances, ensures the fluid flow when the spool retreats, provides for a reduction of leakage and so on. In the hydraulic brake booster of the prior art, an opening lap of the drain port is determined largely due to the importance of providing fluid flow when the spool retreats. As a result, the prior hydraulic brake booster is compelled to increase the idle stroke when the spool advances.

SUMMARY OF THE INVENTION

It is, therefore, an object of the present invention to provide an improved hydraulic brake booster which is able to control the hydraulic pressure control valve with pair of levers at the pertinent positions even though the errors of measurement, the scattering and so on which exists in each of the parts which include the hydraulic pressure control valve and the pair of levers.

It is another object of the present invention to decrease the idle stroke when the spool advances and still permit the fluid flow when the spool retreats or withdraws.

It is a further object of the present invention to improve the operational feeling of the hydraulic brake booster which actuates a master cylinder by a hydraulic power pressure supplied from a power source in response to an input rod connected to a brake pedal. The arrangement includes a housing connected to the master cylinder, a power piston slidably disposed in a boost chamber which is defined in the housing and transmitting a boost force which is generated in response to the input rod. A hydraulic pressure control valve having a valve body is moved between a power position communicated with the power source and an initial position communicated with a reservoir in the boost chamber on an axis extending substantially in parallel with a sliding axis of the power piston. A control lever is engaged with the valve body of the hydraulic pressure control valve at one end and engaged with the power piston at its other end, a support lever is pivotally connected with the control lever so as to be pivotally movable and connected with the input rod at its one end of the support lever. A support member is installed to the housing so as to pivotally support the other end of the support lever so as to be pivotally movable and regulating at least the initial position of the valve body of the hydraulic pressure control valve through one end of the control lever.

In the above hydraulic brake booster, when the brake pedal is depressed, the braking force adds to the input rod. Then, in response to this movement, a force which moves in a sliding direction of the power piston is added to one end of the support lever and the support lever pivotally moves about the support member. At this time, the other end of the control lever, which is pivotally connected to the support lever, engages with the power piston and holds an initial position until the beginning of the sliding of the power piston. Accordingly, the control lever pivotally moves about the connecting axis between both levers, and the end of the control lever which is engaged with the valve body of the hydraulic pressure control valve moves in the movement direction of the input rod, namely, in the sliding direction of the power piston. The valve body of the hydraulic pressure control valve moves from its initial position to the power position, and a hydraulic power pressure is supplied from the power source to the boost chamber. When the hydraulic power pressure is applied to the power piston, the power piston moves with respect to the input rod. When the hydraulic pressure in the boost chamber reaches a predetermined hydraulic pressure and the position relationship between the power piston and the input rod assumes a first position relationship, the valve body of the hydraulic pressure control valve moves to the initial position. The supply of the power hydraulic pressure stops and the boost chamber communicates with the reservoir. As a result, hydraulic pressure in the boost chamber decreases. With this operation performed repeatedly, the hydraulic pressure within the boost chamber is regulated to a predetermined boost pressure.

Since the valve body of the hydraulic pressure control valve engages with the power piston, the initial position of the valve body is determined in response to the position of the support lever which is pivotally connected to the control lever. The support lever is pivotally supported by the support member. Accordingly, the initial position of the valve body of the hydraulic pressure control valve can be adjusted by the support member, whereby the initial position is regulated the predetermined position.

Thereby, even though an error in dimensional accuracy or scattering exists in each part, these are assimilated by the adjustment of the support member and the initial position of the hydraulic pressure control valve is not adversely influenced.

BRIEF DESCRIPTION OF THE DRAWINGS

Additional objects and advantages of the present invention will become more apparent from the following detailed description of the preferred embodiments thereof when considered with reference to the attached drawings, in which:

FIG. 2b is a view seen from the direction b—b in FIG. 2a;

FIG. 2c is a sectional view taken substantially along the line c—c of FIG. 2a;

FIG. 3b is a sectional view taken substantially along the line b—b of FIG. 3a.

DESCRIPTION OF THE PREFERRED EMBODIMENTS

A hydraulic brake booster constituted in accordance with a preferred embodiment of the present invention will be described with reference of the drawings.

Figure 1:
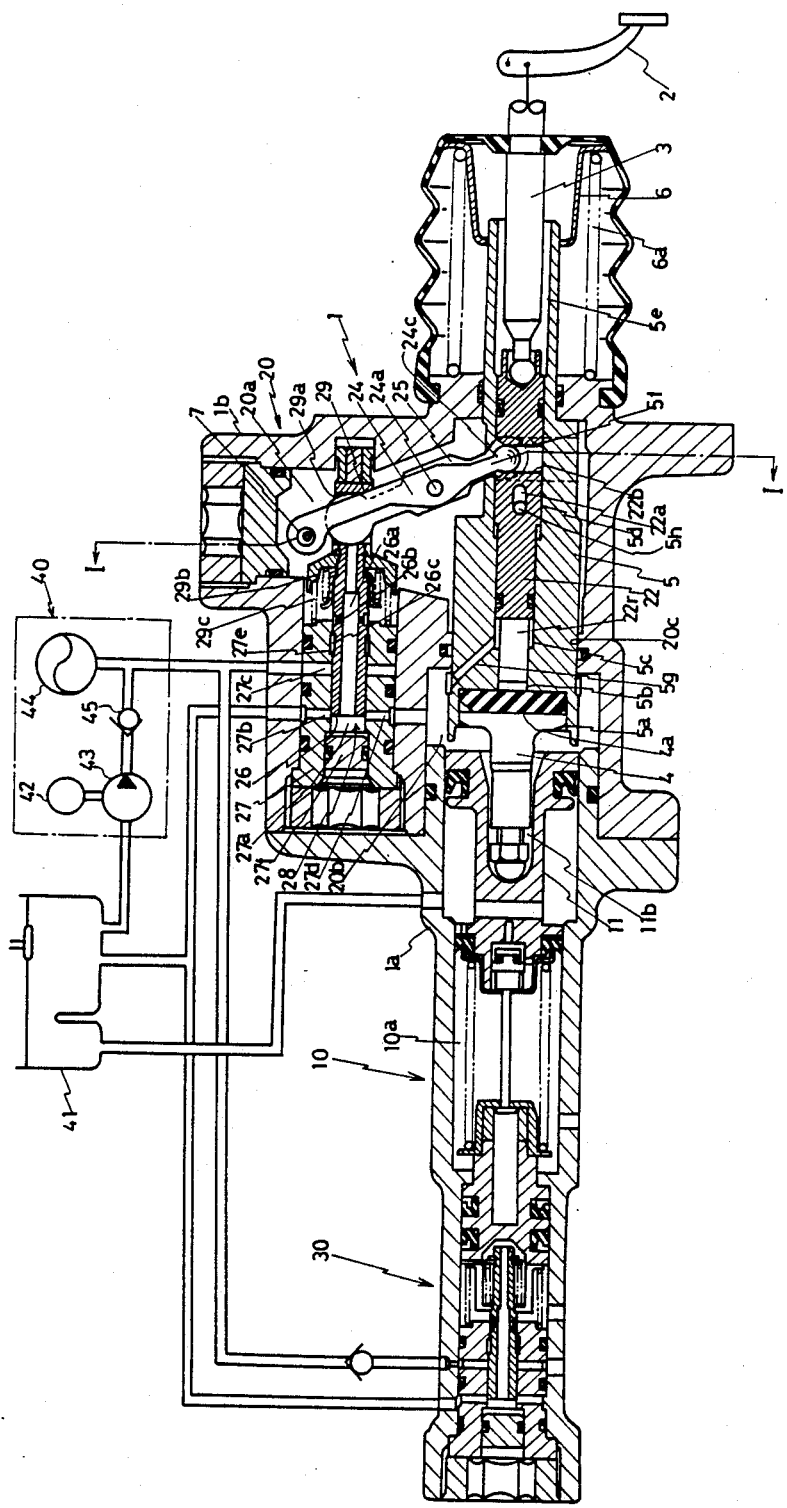
FIG. 1 is a schematic illustration of a hydraulic brake booster of one embodiment of the present invention with a sectional view of a hydraulic braking pressure generator thereof.

Referring to FIG. 1, there is schematically illustrated a hydraulic braking pressure generator 1 which includes a master cylinder 10, a hydraulic brake booster 20 and a regulator 30. The hydraulic brake booster 20 of one embodiment of the present invention is described below with reference to FIG. 1 and FIG. 2.

In a housing 1b joined with a housing 1a, a boost chamber 20a and a low-pressure chamber 20b of the hydraulic brake booster 20 are defined. A power piston 5 is sealed in a fluid-tight manner and slidably disposed in a bore 20c which is formed between a retainer 6 and the housing 1b so as to normally bias the power piston 5 toward the brake pedal 2. The power piston 5 has, at its middle portion, a shoulder portion which is adapted to abut against the housing 1b so as to restrict the power piston 5 from sliding toward the brake pedal 2.

In the power piston 5, a recess is formed at the end facing the master piston 11, and a stepped bore is formed axially in the center. This stepped bore comprises a small-diameter bore 5b, an intermediate bore 5c, a large-diameter bore 5d and an open end bore 5e. In the stepped bore, a reaction rod 22r is slidably received in the small-diameter bore 5b. A reaction piston 22 has a small-diameter portion which is received in the intermediate-diameter bore 5c and a large-diameter portion received in the large-diameter bore 5d. The axial length of the reaction rod 22r is greater than the length of the small-diameter bore 5b of the stepped bore. In reaction piston 22, an elongated hole 22a is formed and extends coaxially with the axis of the reaction piston 22. A through-hole 22b extends perpendicularly to the elongated hole 22a. A pin 5h, fixed to the power piston 5, is positioned in the elongated hole 22a, so that the reaction piston 22 is restricted from sliding, at least toward the brake pedal 2, with respect to the power piston 5.

The large-diameter portion of the reaction piston 22 is provided with a recess at its end opposite the small diameter bore 5b. One end of an input rod 3 is connected to the brake pedal 2, and the other end of the input rod 3 is provided with a spherical head which is inserted through the open end bore 5e of the power piston 5 and received in the recess of the reaction piston 22, and is engaged with a projection formed on the inner surface of the recess.

Between the intermediate-diameter bore 5c and the reaction rod 22r, an annular space is defined due to the difference in axial length between the reaction rod 22r and the small-diameter bore 5b, and is in communication with the low-pressure chamber 20b through a bore passage 5g. The large-diameter end portion of the output rod 4 is received in the recess 5a of the power piston 5 via an elastic reaction disk 4a and is held in the recess 5a by a leaf spring. Normally, a gap exists between the reaction disk 4a and the end of the reaction rod 22r. The output rod 4 is disposed in the opening 11b of the master piston 11, and the head of the output rod 4 is in contact with the bottom surface of the opening 11b.

A support lever 24 is provided, at one end thereof, with a spherical head 24c. The spherical head 24c is fitted or received in the through-hole 22b of the reaction piston 22. Accordingly, the support lever 24 is interlocked with the input rod 3 which actuates with the reaction piston 22.

The support lever is pivotally connected at its other end to the housing 1b by an eccentric rod 7 for pivotal movement within the boost chamber 20a. A control lever 25 is pivotally connected with the support lever 24 by a pin 24a which is positioned approximately in its center, and one head of the control lever 25 is fitted or received in the through-hole 5f of the power piston 5. The control lever 25 includes two sheets of board material which nip the support lever approximately in its center. Accordingly, when the reaction piston 22 slides toward the output rod 4 with respect to the power piston 5 which is pressed toward the brake pedal 2, a rotating force is exerted on the support lever 24 so as to pivotally move the support lever 24 clockwise about the eccentric rod 7. At this time, since one head of the control lever 25 is retained in the through-hole 5f of the power piston 5, the other head of the control lever 25 is rotated counterclockwise about the pin 24a and hence, is moved in the sliding direction of the reaction piston 22. As a result, the other head of the control lever 25 is displaced in response to movement of the reaction rod 22r until the reaction rod 22r comes into contact with the reaction disk 4a.

Figure 2A:
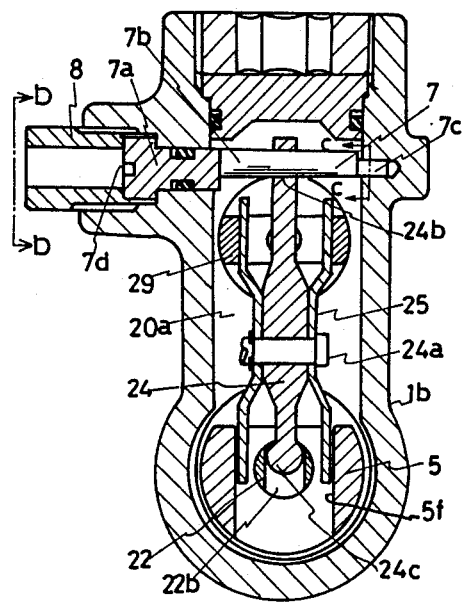
FIG. 2a is a sectional view taken substantially along the line I—I of FIG. 1.
Figure 2B:
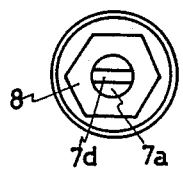
Figure 2C:

The pivotal connection of the support lever 24 to the housing 1b is shown in FIG. 2a. In FIG. 2a, the eccentric rod 7, which constitutes a support member of the present invention, is received through the opening 24b of the support lever 24 and is fixed to the housing 1b by a member 8. The eccentric rod 7 has a columnar axis portion 7b fitted or received in the opening 24b of the support lever 24, a columnar support portion 7c having a sectional center at an eccentric position with respect to a sectional center of the axis portion 7b. The support portion 7c has a diameter which is smaller than the axis portion 7b (as shown in FIG. 2c) and an adjust portion 7a, which has a sectional center on the same axis with respect to the sectional center of the support portion 7c, has a diameter larger than the axis portion 7b. The adjust portion 7a and the support portion 7c are formed on opposite sides of the axis portion 7b, respectively. These portions may be formed integrally in a body or, may be connected with each other after being separately formed. The adjust portion 7a is provided with a large-diameter portion at an end portion opposite the support portion 7c. The large-diameter portion contacts with a shoulder portion of an installation opening formed in the housing 1b. Further, the adjust portion 7a is provided with a groove 7d so as to permit rotation of the adjust portion 7a by a tool, such as a screw driver, from outside of the housing 1b.

As mentioned above, the axis portion 7b of the eccentric rod 7 rotates in the opening 24b of the support lever 24 about the support portion 7c and the adjust portion 7a by rotation of the adjust portion 7a. Further, the member 8 is installed in the installation opening of the housing 1b by threaded engagement therewith and contacts the end surface of the adjust portion 7a. The member 8 has an annular shape and has a hexagonal shaped opening as shown in FIG. 2b. The eccentric rod 7 is secured so as to not permit rotation of the adjust portion 7a after determination of the prescribed rotational position of the eccentric rod 7.

The housing 1b has a spool-valve bore extending substantially in parallel with the power piston 5 and communicating with the boost chamber 20a. A spool valve 28, which constitutes the hydraulic pressure control valve of the present invention, is received in the spool valve bore. The spool valve 28 has a spool 26 slidably received in a spool bore 27a formed in a cylinder 27 substantially in parallel with the power piston 5. One end of the spool bore 27a is closed off, in a fluid-tight manner, by a closure member 27f. The spool 26 constitutes the valve member of the present invention. In the spool 26, formed axially therethrough is a opening 26a, and formed radially therethrough is an opening 26b communicating with the opening 26a. One end of the spool 26 is positioned in the boost chamber 20a and is connected to one end of the control lever 25 by a through-hole 29a radially bored in the control rod 29. Between the cylinder 27 and a retainer 29b formed at one end of the control rod 29, a spring 29c is mounted so as to normally bias the spool 26 toward the control lever 25. The through-hole or opening 26a normally opens to the boost chamber 20a at the junction of the spool 26 and the control rod 29.

When the control lever 25 is in its initial position, the through-hole 26a of the spool 26 is communicated with the reservoir 41 and the low-pressure chamber 20b through a passage 27b radially bored in the cylinder 27. A passage 27d communicates with the passage 27b via the peripheral groove formed around the outer surface of the cylinder 27, and the corresponding ports formed in the housing 1b. Thus, the boost chamber 20a is also communicated with the reservoir 41 and is filled with the brake fluid under atmospheric pressure. A passage 27c, communicating with the power source 40, is formed in the cylinder 27, a predetermined distance from the control rod 29. The passage 27c is normally closed by the peripheral surface of the spool 26. Between the passage 27c and the end of the spool 26 facing the control rod 29, an annular groove 27e is formed on the inner surface of the cylinder 27, and an annular groove 26c is formed on the peripheral surface of the spool 2 in opposing relation to the annular groove 27e.

As mentioned above, the position of the spool 26 is determined by the position of the control lever 25 and the position of the support lever 24 connected to the control lever 25. Further, since the spherical head of the support lever 24 is actuated by the reaction piston 22 and the input rod 3, the position of the spool 26 is determined by the position of the pivotally connecting portion of the support lever 24 to the housing 1b. Namely, the initial position of the spool 26 is determined by the position of the axial center of the eccentric rod 7 pivotally supporting the support lever 24 to the housing 1b.

Thus, when the member 8, which is the support member of the support lever 24, is loosened and the adjusting portion 7a of the eccentric rod 7 is rotated, the axis portion 7b is rotated in the opening 24b of the support lever 24 about the support portion 7c and the adjusting portion 7a. As a result, the support lever 24 is moved toward or away from the spool 26 a maximum distance which is determined by the eccentric distance of the axis portion 7b. Accordingly, the initial position of the spool 26 is determined so as to optimize the lap quantity of the spool 26, particularly, the initial position of the spool 26 is determined so as to position the spool 26 with regard to the passage 27b communicating with the drain port. After the determination of the initial position of the spool 26, the adjusting portion 7a is pressed by the rotation of the member 8 and the eccentric rod 7 is secured.

When the brake pedal 2 is depressed and the reaction piston 22 is pressed through the input rod 3, the reaction rod 22r moves until it comes into contact with the reaction disk 4a. Thereby, the control lever 25 is pivotally moved counterclockwise with respect to the support lever 24 and the head portion of the control lever 25 presses against the spool 26. When the spool 26 is moved toward the closure member 27f in response to movement of the control lever 25, the passage 27b of the cylinder 27 is closed. The passage 27c in turn faces the annular groove 26c of the spool 26, and the annular groove 27e faces the annular groove 26c and the opening 26b. Consequently, the passage 27c is communicated with the through-hole or bore 26a. Accordingly, the hydraulic power source 40 is introduced into the boost chamber 20a to increase the hydraulic pressure therein, and the reaction force is thereby transmitted to the brake pedal 2 via the reaction piston 22. At the same time, the raised hydraulic pressure is applied to the master piston 11 via the power piston 5. The power piston 5 moves until the pin 5h, which is in the elongated opening 22a, moves a maximum distance defined by the length of the opening 22a with respect to the reaction piston 22. Thereby, the relative position of the control lever 25 and the support lever 24 assumes that of its initial state. Accordingly, the control lever 25 is moved clockwise about the pin 24a to retract the control rod toward the brake pedal 2. The passage 27c of the cylinder 27 is thereby closed and, in turn, the passage 27b is communicated with the bore 26a of the spool 26 to lower the hydraulic pressure in the boost chamber 20a so that the power piston 5 is moved toward the brake pedal 2. With this operation performed repeatedly, the hydraulic pressure within the boost chamber 20a is regulated to a predetermined boost pressure.

The power source 40 comprises an accumulator 44 for generating a hydraulic power pressure along with a fluid pump 43 which is connected to the accumulator 44 via a check valve 45 and connected to the reservoir 41 which stores an amount of hydraulic fluid. The fluid pump 43 is operated by a motor 42 which is actuated by an electric control signal from an electric control device (not shown).

Figure 3A:
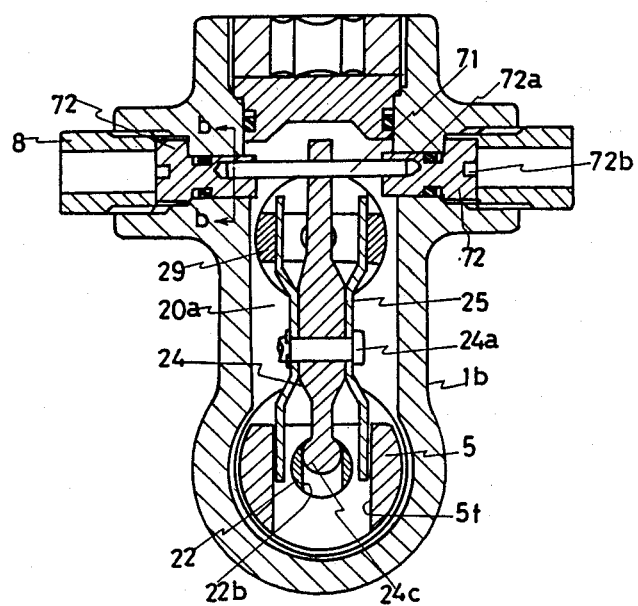
FIG. 3a is sectional view of a hydraulic brake booster of another embodiment of the present invention.
Figure 3B:

FIG. 3a and FIG. 3b show another embodiment of the support member of the present invention. In FIG. 3a and FIG. 3b, the same parts with regard to FIG. 1 and FIG. 2 is shown by same numeral and the description of these same parts is omitted.

As shown in FIG. 3a, in this embodiment, the support member consists of a columner rod 71, a pair of eccentric collars 72 and the member 8. Both ends of the rod 71 are fitted into an eccentric journal portion 72a of the pair of eccentric collars 72 fitted into the housing 1b and are supported therein. The eccentric collars 72 includes a columner journal portion having a diameter which is larger than rod 71 and an end portion having an end surface in which is formed a groove 72b and has a diameter which is larger than the columnar journal portion. The end portion of the eccentric collar 72 contacts a shoulder portion of the installing opening of the housing 1b. Further, a pair of members 8, which are adjacent to a pair of eccentric collars 72, are installed. The members 8 are axially movable by rotation. The members 8 increase the contact pressure between the member 8 and the eccentric collars 72 by the axial movement and fixedly position the eccentric collars 72.

When adjusting the initial position of the spool 26, since the rod 71 is supported in the eccentric journal portion 72a, the support lever 24 is able to be moved in a direction to approach or separate the spool 26 by a maximum distance determined by the eccentric distance of the eccentric journal portion 72a as it is moved by the rotation of the eccentric collar 72. The eccentric collar 72 is fixed by the member 8 in a position in which the lap quantity of the spool 2 is optimized. It is also contemplated that the pair of eccentric collars 72 could be replaced by a single collar.

In the embodiments, the hydraulic pressure control valve is constituted by the spool valve, however, it is possible to provide the hydraulic pressure control valve as a ball valve instead of the spool valve. Of course, in this case, according to the present invention, it must be able to pertinently determine the initial position of the control valve. The support member regulates the initial position of the valve body and a power position of the valve body is automatically regulated by the support member common, however, it is possible to regulate the power position separately.

As mentioned above, according to the present invention, since the support lever is pivotally supported by the support member which regulates the initial position of the valve body of the hydraulic pressure control valve, it is able to adjust to the valve body of the hydraulic pressure control valve in its initial position by only operation of the support member.

Accordingly, with regard to each of the parts which constitute the hydraulic brake booster, the high degree of accuracy required in the dimension of the elements of the prior art is not necessitated. Therefore, the production of each of the parts of the hydraulic brake booster is improved. Moreover, since the support member is installed in the housing of the brake booster, it is easily adjusted from the outside.

Further, it is not necessary to design the booster in consideration of the accurate dimensions of the prior art, it is able to shorten the drain port lap quantity until the limit province. As a result, the operational feel of the hydraulic brake booster is improved.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulic brake booster for actuating a master cylinder by a hydraulic power pressure supplied from a power source in response to an input rod connected to a brake pedal comprising:
    a housing connected to said master cylinder,
    a power piston slidably disposed in a boost chamber which is defined in said housing and transmitting a boost force which is generated in response to said input rod,
    a hydraulic pressure control valve having a valve body moved between a power position communicated with said power source and an initial position communicated with a reservoir in said boost chamber on an exist extending substantially in parallel with a sliding axis of said power piston,
    a control lever having a first end and a second end, the first end engaged with said valve body of said hydraulic pressure control valve, the second end engaged with said power piston,
    a support lever pivotally connected with said control lever so as to be pivotally movable and connected with said input rod, and
    a support member connected to said housing and pivotally supporting said support lever so as to be pivotally movable and regulating at least said initial position of said valve body of said hydraulic pressure control valve, the support member including an eccentric member rotatably received in an opening of the support lever and pivotally supported by the housing, the eccentric member having an outer surface in sliding engagement with an inner surface of the opening so as to prevent radial movement of the eccentric member relative to the opening, the support member also including a fixing means for fixing the eccentric member in a rotational position, and rotating means for rotating the eccentric member and positioned exteriorly of the hydraulic brake booster.

2. A hydraulic brake booster as recited in claim 1, wherein said hydraulic pressure control valve comprises a spool valve, and said valve body is a spool.

3. A hydraulic brake booster as recited in claim 2, wherein said eccentric member is provided with a collar rotatably positioned in an opening formed in said housing, a rod received in said opening formed in said support lever and pivotally supported to said housing through said eccentric collar.

* * * * *